United States Patent [19]
Mendenhall et al.

[11] Patent Number: 5,323,969
[45] Date of Patent: Jun. 28, 1994

[54] PROCESS AND MECHANISM FOR REDUCTION, LIQUIFYING AND ELIMINATION OF BACK YARD WASTE

[75] Inventors: Abraham H. Mendenhall, County of Morris, N.J.; Joseph Skudrzyk, County of St. Louis, Mo.

[73] Assignee: Elite Ink and Coatings, Ltd., St. Louis, Mo.

[21] Appl. No.: 31,841

[22] Filed: Mar. 16, 1993

[51] Int. Cl.$^5$ ............................................. B02C 19/12
[52] U.S. Cl. ........................................... 241/1; 241/39
[58] Field of Search ......................... 241/39, 15, 1

[56] References Cited

U.S. PATENT DOCUMENTS

| | | | |
|---|---|---|---|
| 3,680,796 | 8/1972 | Galeano | 241/39 X |
| 3,968,937 | 7/1976 | Miller | 241/39 X |
| 4,662,893 | 5/1987 | McIntosh | 241/1 X |

*Primary Examiner*—Douglas D. Watts
*Attorney, Agent, or Firm*—Paul M. Denk

[57] ABSTRACT

A method of treating yard waste includes introducing yard waste into a chamber wherein the yard waste is impinged by high pressure jet of liquid; the liquid from a group of rotating nozzles. The pressurized liquid stream breaks down the yard waste to create a greater surface area for biological microorganisms to attack, thereby speeding up the decomposition of the waste.

4 Claims, 1 Drawing Sheet

PROCESS AND MECHANISM FOR REDUCTION, LIQUIFYING AND ELIMINATION OF BACK YARD WASTE

BACKGROUND OF THE INVENTION

This invention relates to waste reduction, and in particular to a method for reducing and liquifying yard waste.

Presently, back yard waste, consisting of grass cuttings, leaves, twigs, etc., represents somewhere about 12-15% of total waste generated in the United States. This waste amounts to over 50 million tons annually. Burning of this waste is banned in most areas, therefore, this huge amount of waste has to be collected or composted and disposed of. Home owners and commercial landscapers recycle a portion of the composted waste, however, a large amount must still be disposed of. The waste that is collected is done so by municipalities or is dumped illegally, quickly fills landfills. The cost of collection causes budget strains on municipalities and business. There is a need for a method of yard waste treatment which will reduce and/or simplify disposing of waste.

There are currently various devices, such as grinders and chippers or chemical and biological systems, which reduce the size of the waste. But these only reduce size of the waste; any structural change (i.e., decomposition) in the waste may take weeks. This waste must still be disposed of. Mulching lawn mowers have become popular recently. The best commercial types cost over four thousand dollars, or more, however, the smaller home owner types are less effective. Even the use of mulching mowers, after a time, results in a build up of grass clippings creating a larger amount of mulch. The decomposition of this resulting mulch takes time. In time of rapid growth of grass or a large volume of leaves, for example, these mulching mowers may not be able to cope with this increased volume of grass or leaves, and even if they could, the resulting volume of mulch would cause removal and space problems.

SUMMARY OF THE INVENTION

A primary object of this invention, therefore, is to provide an approach which can reduce yard waste to a much smaller volume.

Another object is to provide such an apparatus which can handle volume in peak times and eliminate the waste without current collection problems.

A further object of this invention is to provide a low cost, easily controlled and operated method of disintegration and elimination of back yard waste to provide for rapid decomposition and distribution without the normal collection and disposal process and problems.

Another object is to provide such an apparatus which may be used by both home owners and commercial and municipal companies which are required to collect and distribute yard waste.

These and other objects will become apparent to those skilled in the art in view of the following disclosure and accompanying drawings.

In accordance with the invention, generally stated, a method for decomposing yard waste includes treating the yard waste in a chamber under high pressure liquid to break the waste down into small particles. The water is delivered from rotating nozzles and impinges upon the yard waste to reduce it in size.

DESCRIPTION OF THE PREFERRED EMBODIMENT

Figure 1:
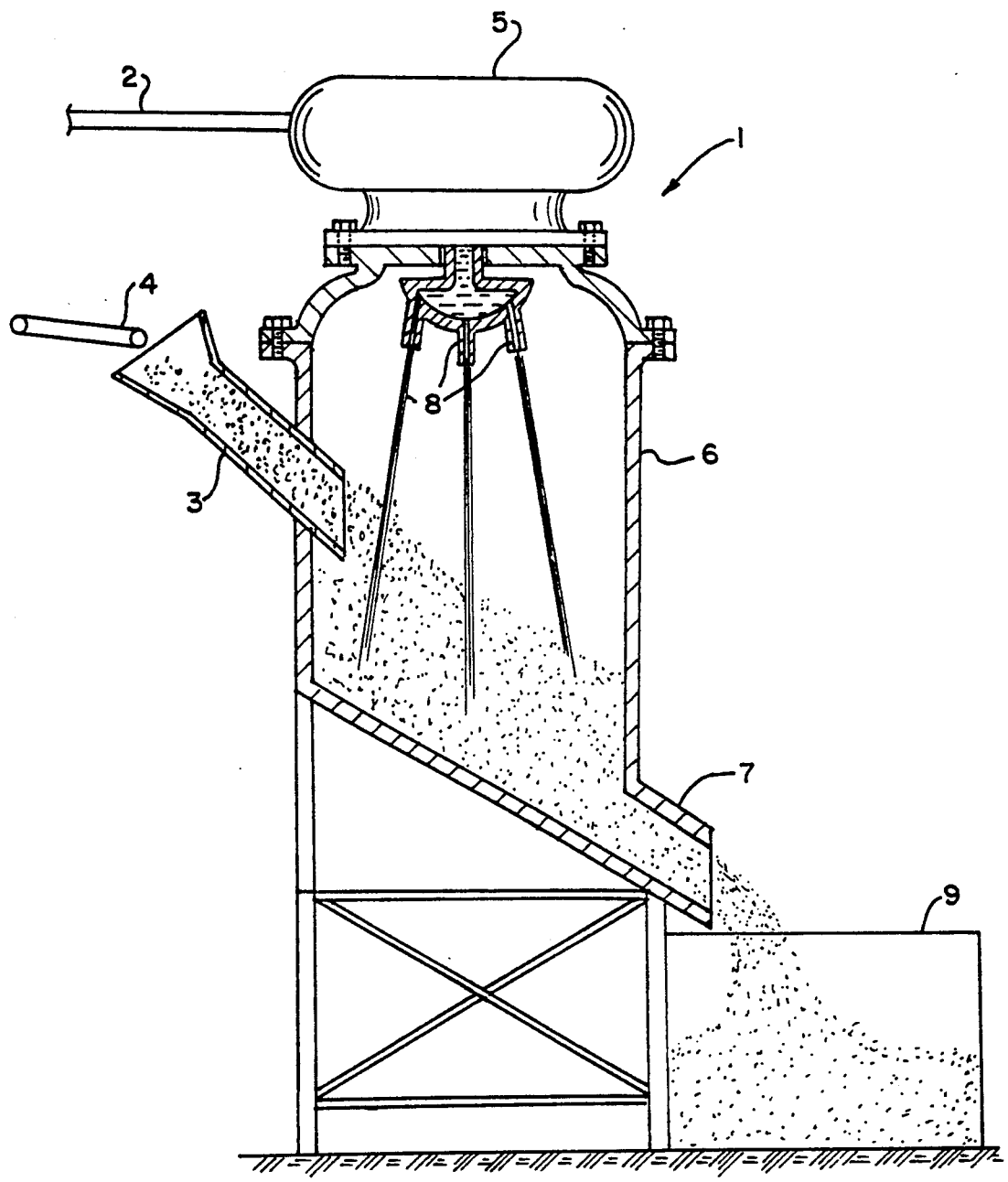
FIG. 1 is a schematic drawing showing a waste reducer according to the invention.

The invention applies to a waste treating device 1 which uses the delivery of high pressure liquid at a predetermined pressure and delivery volume to disintegrate waste into a sludge or near liquid. The invention combines a liquid source 2, which may be a home water supply, a pressure pump 5, a function chamber 6 and an outlet 7 for removing the liquified waste from the chamber 6. Outlet 7 is preferably a valve which may be switched between an open and a closed position.

The waste is fed or placed into the chamber 6, where it is subjected to the high pressure liquid which breaks the waste into extremely small particles. The high pressure liquid is produced by pump 5, which forces water through nozzles 8 to produce a liquid jet. This application of the high pressure liquid to the waste combines with the internal moisture encapsulated naturally in the waste itself, reducing the waste to either a sludge or a liquid, as desired. The final state of the waste depends on whether the waste is homogenous (i.e., just grass) or heterogeneous (grass and leaves, etc.). The resulting sludge or liquid is discharged through outlet 7, into a collector 9 for later application to crops or lawns. Alternatively, the resulting liquid or sludge may be discharged directly to a lawn by an application device (not shown).

The unique use of high pressure liquid jet reduce back yard waste for on site distribution and decomposition with a medium to feed and discharge the waste makes for a very practical and low cost method to eliminate current costly and impractical methods. The waste treatment device can operate either continuously, or in batches. If it is made to operate continuously, then a feeder mechanism, as for example a conveyor means, such as a screw, or conveyor belt or auger should be supplied such as shown at 4. If it is to operate in batches, chamber 6 should be openable so that grass clippings etc. may be introduced therein. It can be stationary or mobile in nature. There can be a variety of sizes and capacities to accommodate various volumes and use factors.

The energy for the waste decomposition is provided by the pump which forces liquid through the jets. The jets are preferably rotatably mounted within chamber 6 to rotate during operation. Such rotation can be attained from a water pressurized rotatable valve, as at 8a. The high pressure liquid attacks the yard waste and causes it to break down into small particles one micron or smaller. Because of the high pressure, the break down of the waste occurs almost instantly, resulting in a liquidy sludge or completely liquid medium which easily flows out discharge outlet 7 when opened.

The small size to which the waste is reduced, and the liquid environment in which it is placed, facilitates the further breakdown of the waste. The speed of this further breakdown is due to the increased surface area of the waste available for natural organisms to attack. This can speed up the decomposition from weeks to days. This breakdown time, of course, depends on weather conditions.

Even if the waste is collected, its volume, after treatment, is only a fraction of its volume before treatment or the volume which results from prior methods of waste collection.

The power, in horse power, of the liquid jets is a function of the liquid volume discharge (Q), and the pressure (P). The formula is as follows:

$$Hp = \frac{Q \times P}{1450}$$

The power settings can be altered to increase or decrease the disintegration process depending on the type or combination types of waste being processed. For example, a lower pressure may be appropriate for grass cuttings as opposed to twigs or hedge cuttings, which may require a higher pressure and volume. This pressure and volume rate can be adjusted by adjusting the rate of water delivery to treatment device 1, the operation settings of pump 5, or the diameter of nozzles 8. Nozzles 8, however, are preferably set and non-adjustable. Also processing time (i.e. the delivery rate of yard waste into the chamber, in combination with discharge rate) will affect the rate and type of the disintegration process.

As can be seen, this method provides a simple and easy method for reducing the volume of waste, for increasing the rate of the waste decomposition. This disclosure is set forth for illustrative purpose only. Variation, within the scope of the appended claims, may be apparent to those skilled in the art.

We claim:

1. A method for decomposing yard waste comprising, introducing yard waste into a chamber, and continuously introducing yard waste into said chamber, the step of introducing the yard waste being performed by a conveyor means;

simultaneously breaking down the introduced yard waste under a stream of high pressure liquid, the step of breaking down the yard waste includes passing liquid under pressure directed substantially downwardly through at least one nozzle arranged thereabove, to form a jet of pressurized liquid which impinges upon the continuously introduced yard waste;

providing a pump means to pressurize the liquid, and regulating the pressure of the directed liquid by setting the horse power output of the pump means according to the formula $$Hp = \frac{Q \times P}{1450}$$

wherein Q equals the liquid volume discharge from the at least one liquid jet, and P is the pressure of the liquid required;

rotating the said at least one nozzle while discharging its pressurized liquid; and continuously removing the treated yard waste from the chamber through fluid conveyance generated from the pressurized liquid continuously introduced into the chamber.

2. A device for continuously treating yard waste to speed up the decomposition of the waste, the device including a container defining a chamber therein, means for accessing said chamber for continuously introducing yard waste into said container, a conveyor means communicating with said accessing means for achieving the continous introduction of yard waste into said container, nozzles provided upwardly within the container and functioning to continuously direct high pressure liquid jet of fluid onto the waste introduced into the container, for simultaneously breaking down the introduced yard waste under the stream of high pressure liquid jets of fluid, said nozzles disposed for directing the pressurized liquid jet substantially downwardly for effecting the breaking down of the yard waste, the liquid jets impinging upon the continously introduced yard waste, pump means pressurizing the liquid for delivery to the nozzles, the pressure of the liquid regulated through a setting of the horse power output of the pump means according to the formula $$Hp = \frac{Q \times P}{1450}$$

said nozzles being rotatable, and chute means connecting with the container at a position below the accessing means for continously removing the treated yard waste from the chamber through fluid conveyance generated from the pressurized fluid as continously introduced into the container chamber.

3. The device of claim 2 wherein said container incorporating a bottom wall, said bottom wall being inclined, and an outlet provided through the container proximate the lowest point of its bottom wall, to provide for the continuous discharge of the treated yard waste and the introduced fluid therefrom.

4. The device of claim 3 and including a collector provided beneath the outlet of the said container, for accumulating the treated yard waste therein.

* * * * *